(12) United States Patent
Chou

(10) Patent No.: US 12,671,970 B2
(45) Date of Patent: Jun. 30, 2026

(54) RESCUE POSITIONING SYSTEM

(71) Applicant: Compal Electronics, Inc., Taipei City (TW)

(72) Inventor: Cheng-Hsin Chou, Taipei City (TW)

(73) Assignee: Compal Electronics, Inc., Taipei City (TW)

( * ) Notice: Subject to any disclaimer, the term of this patent is extended or adjusted under 35 U.S.C. 154(b) by 232 days.

(21) Appl. No.: 18/772,653

(22) Filed: Jul. 15, 2024

(65) Prior Publication Data
US 2025/0386176 A1 Dec. 18, 2025

(30) Foreign Application Priority Data
Jun. 13, 2024 (TW) ................................. 113121791

(51) Int. Cl.
*H04W 4/90* (2018.01)
*H04W 4/029* (2018.01)
(52) U.S. Cl.
CPC .............. *H04W 4/90* (2018.02); *H04W 4/029* (2018.02)
(58) Field of Classification Search
CPC ....... H04W 4/90; H04W 76/50; H04W 4/029; H04W 4/02; H04W 64/00; H04W 4/023;
(Continued)

(56) References Cited

U.S. PATENT DOCUMENTS 7,787,857 B2 * 8/2010 Peterman ............... G01C 21/30
455/404.1
9,563,203 B2 2/2017 Davoodi et al.
(Continued)

FOREIGN PATENT DOCUMENTS

CN 106153001 A 11/2016
CN 109270541 A 1/2019
(Continued)

OTHER PUBLICATIONS

Sailboat Search and Rescue Experiment—1977 (Year: 1977).*

*Primary Examiner* — Nizar N Sivji
(74) *Attorney, Agent, or Firm* — KIRTON McCONKIE; Evan R. Witt

(57) ABSTRACT

A rescue positioning system is provided. The rescue positioning system includes a first rescue positioning device, a communication satellite and a backend monitoring device. The first rescue positioning device includes a communication module, a detection module, a processor and a positioning module. The detection module detects location and environment information of the first rescue positioning device and generates a detection signal. The processor generates a distress signal when the processor determines that the location and environment information is abnormal according to the detection signal. The positioning module obtains a location coordinate of the first rescue positioning device. As the processor generates the distress signal, the processor controls the communication module to transmit the distress signal and the location coordinate to the backend monitoring device through the communication satellite, and the backend monitoring device notifies a rescue person to proceed to a location of the first rescue positioning device for rescue.

21 Claims, 3 Drawing Sheets

(58) Field of Classification Search
CPC ....... H04W 4/025; H04W 4/024; H04W 4/38;
H04W 68/00; H04W 84/06; H04W
36/322; H04B 7/18513; H04B 7/18515;
H04B 1/0343; H04B 1/0346; G08B
25/016; G08B 25/00; G08B 23/00; G08B
17/00; G08B 21/0288; G08B 21/0202
See application file for complete search history.

(56) References Cited

U.S. PATENT DOCUMENTS

| | | | |
|---|---|---|---|
| 10,534,404 B2 | 1/2020 | Bhattacharyya | |
| 2017/0023676 A1 | 1/2017 | Laster | |
| 2024/0428675 A1 * | 12/2024 | Sun ........................ | A61B 5/681 |

FOREIGN PATENT DOCUMENTS

| | | | | | |
|---|---|---|---|---|---|
| CN | 111585866 B | * | 12/2021 | | |
| CN | 219658029 U | * | 9/2023 | | |
| CN | 114745659 B | * | 12/2023 | | |
| CN | 119729383 A | * | 3/2025 | | |
| EP | 3836584 A1 | * | 6/2021 | ............ | G06Q 50/26 |
| KR | 101356022 B1 | | 1/2014 | | |
| TW | 200825991 A | | 6/2008 | | |
| TW | I304038 B | | 12/2008 | | |
| TW | M396613 U1 | | 1/2011 | | |
| TW | I493212 B | | 7/2015 | | |
| TW | M564323 U | | 8/2018 | | |
| TW | I652651 B | | 3/2019 | | |
| TW | M653679 U | | 4/2024 | | |

* cited by examiner

RESCUE POSITIONING SYSTEM

CROSS-REFERENCE TO RELATED APPLICATION

This application claims priority to Taiwan Patent Application No. 113121791 filed on Jun. 13, 2024. The entire contents of the above-mentioned patent application are incorporated herein by reference for all purposes.

FIELD OF THE INVENTION

The present disclosure relates to a rescue positioning system, and more particularly to a rescue positioning system based on communication satellites.

BACKGROUND OF THE INVENTION

Currently, when a mountain accident occurs, there is no positioning system that can immediately determine the exact location of the victim. As for maritime accidents, only some ships and naval personnel use AIS (Automatic Identification System) or the Poseidon System. Other than these, there is no positioning system that can determine the location of ordinary personnel.

AIS can be equipped on ships and uses the VHF band, with a transmission distance of approximately 20 nautical miles. However, the actual transmission distance may be shortened due to weather and sea waves. Limited by the transmission distance, distress signals need to be relayed through the AIS of other ships to be transmitted to the shore station. If there is no other ship equipped with AIS within 20 nautical miles of the distressed ship, the distress signal cannot be received or transmitted. Moreover, since the AIS is a globally shared system, once a distress signal is sent, all ships equipped with AIS within the transmission range can receive the distress signal, leading to potential information leakage in certain confidential circumstances.

The Poseidon System uses LoRa (Long Range) wireless transmission, which is a type of LPWAN communication technology, with a transmission distance of about 20 kilometers. Similarly, limited by the transmission distance, distress signals also need to be relayed through relay stations to be transmitted to the backend.

Consequently, in the event of a mountain or maritime accident, it is often impossible to immediately determine the exact location of the victim, leading to the mobilization of numerous personnel for a blanket search, which is extremely time-consuming. Further, since the exact location of the victim cannot be determined, it is difficult to prepare appropriate rescue equipment according to the terrain where the victim is located, causing rescue personnel to possibly get injured due to the terrain during the search and rescue process.

Therefore, there is a need of providing a rescue positioning system in order to overcome the drawbacks of the conventional technologies.

SUMMARY OF THE INVENTION

The present disclosure provides a rescue positioning system in which the communication satellite communicates with the rescue positioning device and the backend monitoring device. The rescue positioning device may transmit signals to the backend monitoring device or receive signals from the backend monitoring device through the communication satellite, without the need of relay stations for signal transmission. Consequently, the signal transmission would not be limited by distance, climate or terrain, and simultaneously the confidentiality of the signal transmission is ensured. Additionally, the rescue positioning device obtains the location coordinate through the satellite positioning system and, in the event of anomaly, immediately transmits the distress signal and location coordinate to the backend monitoring device through the communication satellite. Accordingly, the backend monitoring device can immediately ascertain the exact location and arrange for rescue, thereby improving rescue efficiency.

In accordance with an aspect of the present disclosure, a rescue positioning system is provided. The rescue positioning system includes a first rescue positioning device, a communication satellite and a backend monitoring device. The first rescue positioning device and the backend monitoring device respectively communicate with the communication satellite and are configured to transmit signals to each other through the communication satellite. The first rescue positioning device is configured to be worn by a user, and the first rescue positioning device includes a communication module, a detection module, a processor and a positioning module. The communication module is configured to communicate with the communication satellite. The detection module is configured to detect location and environment information of the first rescue positioning device and generate a detection signal correspondingly. The processor is electrically connected to the communication module and the detection module and receives the detection signal. The processor is configured to generate a distress signal when the processor determines that the location and environment information of the first rescue positioning device is abnormal according to the detection signal. The communication module is configured to automatically transmit the distress signal to the backend monitoring device through the communication satellite as the processor generates the distress signal. The positioning module is electrically connected to the processor and is configured to obtain a location coordinate of the first rescue positioning device through a satellite positioning system. The processor is configured to control the communication module to transmit the location coordinate to the backend monitoring device through the communication satellite as the processor generates the distress signal. The backend monitoring device is configured to notify a rescue person to proceed to a location of the first rescue positioning device according to the location coordinate for rescue upon receiving the distress signal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
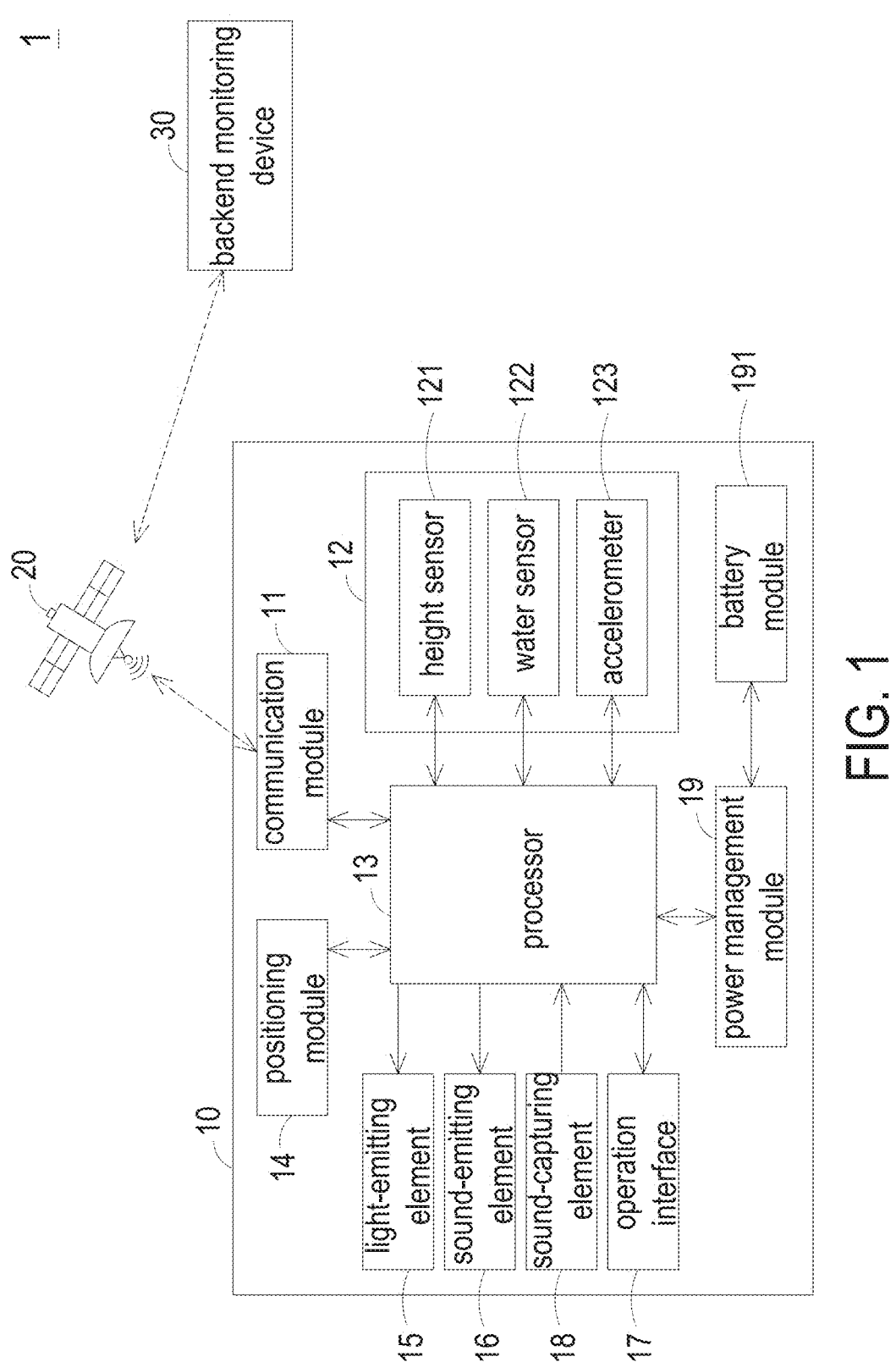
FIG. 1 is a schematic block diagram illustrating a rescue positioning system according to an embodiment of the present disclosure.

FIG. 1 is a schematic block diagram illustrating a rescue positioning system according to an embodiment of the present disclosure. As shown in FIG. 1, the rescue positioning system 1 includes a rescue positioning device 10, a communication satellite 20 and a backend monitoring device 30. The rescue positioning device 10 and the backend monitoring device 30 respectively communicate with the communication satellite 20, thereby realizing the signal transmission between the rescue positioning device 10 and the backend monitoring device 30 through the communication satellite 20. For example, through the communication satellite 20, the backend monitoring device 30 may transmit signals to the rescue positioning device 10 or receive signals from the rescue positioning device 10. In an embodiment, the backend monitoring device 30 may control the rescue positioning device 10 by transmitting signals to the rescue positioning device 10. Additionally, the communication satellite 20 is for example but not limited to a low Earth orbit satellite. In an embodiment, the backend monitoring device 30 communicates with the communication satellite 20 through a ground receiver.

The rescue positioning device 10 is configured to be worn by a user and includes a communication module 11, a detection module 12, a processor 13, and a positioning module 14. The communication module 11 is configured to communicate with the communication satellite 20, so as to transmit signals to the backend monitoring device 30 or receive signals from the backend monitoring device 30 through the communication satellite 20. The communication module 11 may be a satellite communication transceiver.

The detection module 12 is configured to detect the location and environment information of the rescue positioning device 10 and generate a detection signal correspondingly. The processor 13 is electrically connected to the communication module 11 and the detection module 12 and receives the detection signal generated by the detection module 12. Further, when the processor 13 determines that the location and environment information of the rescue positioning device 10 is abnormal according to the detection signal, the processor 13 generates a distress signal. As the processor 13 generates the distress signal, the communication module 11 automatically transmits the distress signal to the backend monitoring device 30 through the communication satellite 20. The positioning module 14 is electrically connected to the processor 13 and obtains a location coordinate of the rescue positioning device 10 through the satellite positioning system. As the processor 13 generates the distress signal, the processor 13 automatically controls the communication module 11 to transmit the location coordinate to the backend monitoring device 30 through the communication satellite 20. The backend monitoring device 30 performs corresponding operation upon receiving the distress signal, such as notifying the rescue person to proceed to the location of the rescue positioning device 10 according to the location coordinate for rescue.

From the above descriptions, through the communication satellite 20, the rescue positioning device 10 may transmit signals to the backend monitoring device 30 or receive signals from the backend monitoring device 30 without the need of relay stations for signal transmission. Consequently, the signal transmission would not be limited by distance, climate or terrain, and simultaneously the confidentiality of the signal transmission is ensured. Additionally, the rescue positioning device 10 obtains the location coordinate through the satellite positioning system and, in the event of anomaly, immediately transmits the distress signal and the location coordinate to the backend monitoring device 30 through the communication satellite 20. Accordingly, the backend monitoring device 30 can immediately ascertain the exact location and arrange for rescue, thereby improving rescue efficiency.

It is noted that the sensors included in the detection module 12 and the criteria used by the processor 13 to determine whether the information detected by the detection module 12 is abnormal can be adjusted according to actual application requirements. For example, in an embodiment, when the rescue positioning device 10 is applied for water rescue, the detection module 12 may include a height sensor 121 and a water sensor 122. The height sensor 121 is configured to detect an altitude of the rescue positioning device 10. The height sensor 121 may use a barometric altimeter to estimate the altitude by measuring atmospheric pressure, or use an altimeter to estimate the altitude by performing triangulation based on the satellite positioning system. The water sensor 122 is configured to detect whether the rescue positioning device 10 is in water by detecting environmental impedance or capacitance changes or using a mechanical device, for example. The location and environment information includes the altitude and whether the rescue positioning device 10 is in water. When the processor 13 confirms that the change in altitude exceeds a preset value (e.g., an altitude change of more than three meters within one second) and the rescue positioning device 10 is in water according to the detection signal, which means that the rescue positioning device 10 and its user may have fallen into the water, the processor 13 determines that the location and environment information of the rescue positioning device 10 is abnormal and generates the distress signal. In another embodiment, when the rescue positioning device 10 is applied for mountain accident rescue, the detection module 12 may include the height sensor 121 and an accelerometer 123. The accelerometer 123 is configured to detect an acceleration of the rescue positioning device 10 and is for example but not limited to a capacitive accelerometer, a piezoelectric accelerometer, or a piezoresistive accelerometer. The location and environment information includes the altitude and the acceleration. When the processor 13 confirms that the change in altitude exceeds a preset value (e.g., an altitude change of more than three meters within one second) and the acceleration is greater than another present value according to the detection signal, which means that the rescue positioning device 10 and its user may have encountered a mountain accident (e.g., falling into a ravine), the processor 13 determines that the location and environment information of the rescue positioning device 10 is abnormal and generates the distress signal.

In addition, in an embodiment, the detection module 12 further detects the physiological information of the user wearing the rescue positioning device 10 and generates the detection signal correspondingly. When the processor 13 determines that the physiological information of the user is abnormal according to the detection signal, the processor 13 generates the distress signal. The detection module 12 may include an optical heart rate sensor, a red-light sensor, and/or an infrared sensor to detect the heart rate, blood oxygen saturation, and/or body temperature of the user, but not limited thereto.

Of course, the sensors included in the detection module 12 and the accident rescue applications suitable for the rescue positioning device 10 are not limited thereto. In addition, the rescue positioning device 10 may be applied for multiple types of accident rescue applications simultaneously.

In an embodiment, the rescue positioning device 10 further includes a power management module 19 and a battery module 191. The power management module 19 is electrically connected between the battery module 191 and the processor 13. The battery module 191 is configured to supply power to the rescue positioning device 10, and the power management module 19 is configured to control the charging and discharging of the battery module 191.

Figure 2:
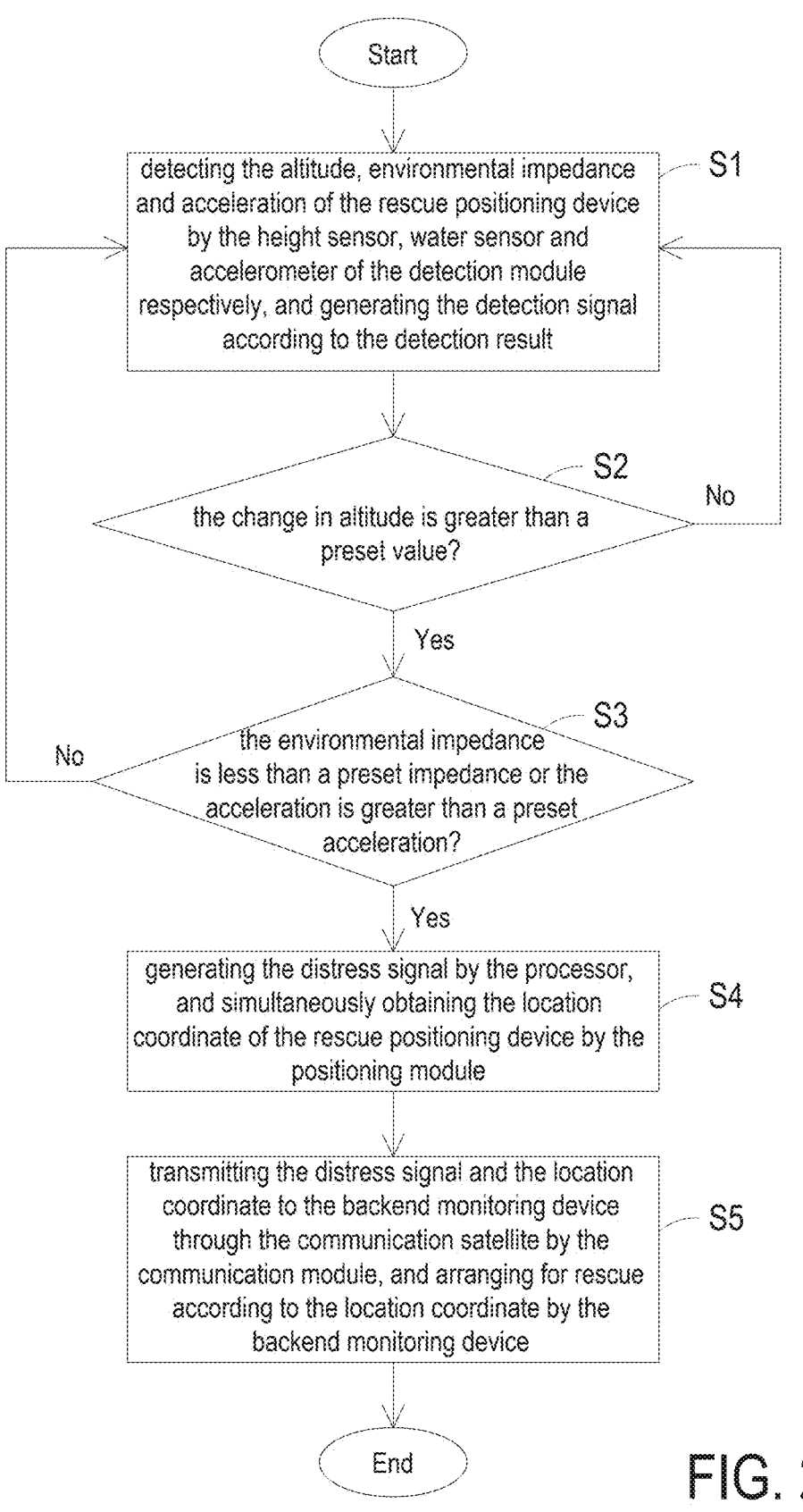
FIG. 2 is a schematic flow chart illustrating a rescue positioning method according to an embodiment of the present disclosure.

FIG. 2 is a schematic flow chart illustrating a rescue positioning method according to an embodiment of the present disclosure, and the rescue positioning method is applicable to the rescue positioning system 1 shown in FIG. 1. As shown in FIG. 2, the rescue positioning method includes the following steps. First, in step S1, the altitude, environmental impedance and acceleration of the rescue positioning device 10 are detected by the height sensor 121, water sensor 122 and accelerometer 123 of the detection module 12 respectively, and the detection signal is generated according to the detection result. Then, in step S2, whether the change in altitude is greater than a preset value (e.g., an altitude change of more than three meters within one second) is determined according to the detection signal by the processor 13. If the determination result of step S2 is negative, the step S1 is performed again. Alternatively, if the determination result of step S2 is positive, step S3 is performed. In the step S3, whether the environmental impedance is less than a preset impedance (e.g., 100 KΩ) or the acceleration is greater than a preset acceleration is determined according to the detection signal by the processor 13. If the determination result of step S3 is negative, the step S1 is performed again. Alternatively, if the determination result of step S3 is positive, which means that the rescue positioning device 10 and its user may have fallen into water or into a ravine, step S4 is performed. In the step S4, the distress signal is generated by the processor 13, and simultaneously the location coordinate of the rescue positioning device 10 is obtained by the positioning module 14. Finally, in step S5, the distress signal and the location coordinate are transmitted to the backend monitoring device 30 through the communication satellite 20 by the communication module 11, and the backend monitoring device 30 arranges for rescue according to the location coordinate.

Please refer to FIG. 1 again. To make it easier for the rescue person to find the victim, the rescue positioning device 10 may emit warning lights or sounds when the processor 13 generates the distress signal. In an embodiment, the rescue positioning device 10 further includes a light-emitting element 15. When the processor 13 generates the distress signal, the processor 13 controls the light-emitting element 15 to emit warning lights with a preset brightness and frequency. The light-emitting element 15 may include light-emitting diodes, but not exclusively. In an embodiment, the rescue positioning device 10 further includes a sound-emitting element 16. When the processor 13 generates the distress signal, the processor 13 controls the sound-emitting element 16 to emit warning sounds with a preset volume and frequency. The sound-emitting element 16 may include speakers or buzzers, but not exclusively. In addition, in an embodiment, the processor 13 continuously controls the communication module 11 to transmit the location coordinate of the rescue positioning device 10 to the backend monitoring device 30 through the communication satellite 20 with a preset frequency such that the backend monitoring device 30 can obtain the movement trajectory of the rescue positioning device 10. Further, when the rescue positioning device 10 sends out the distress signal, the movement trajectory would be beneficial for the search and rescue operation.

In an embodiment, the rescue positioning device further includes an operation interface 17 electrically connected to the processor 13 and configured for the user to operate to control the components of the rescue positioning device 10. Depending on actual requirements, the operation interface 17 allows the user to operate for realizing different functions. The operation interface 17 may include a hardware operation interface and/or a software operation interface, such as buttons, keyboards, touch screens, and/or touchpads, but not limited thereto. For example, the user may operate the operation interface 17 to make the processor 13 control the light-emitting element 15 to emit warning lights and even to adjust the brightness and emitting frequency of the warning lights (e.g., lowering the frequency of emitting the warning lights when the battery of the rescue positioning device 10 is low). Similarly, the user may operate the operation interface 17 to make the processor 13 control the sound-emitting element 16 to emit warning sounds and even to adjust the volume and emitting frequency of the warning sounds (e.g., reducing the frequency of emitting the warning sounds when the battery of the rescue positioning device 10 is low). Additionally, in an embodiment, the rescue positioning device 10 further includes a sound-capturing element 18 electrically connected to the processor 13. The user may operate the operation interface 17 to make the processor 13 control the sound-capturing element 18 to capture sounds and generate a sound signal correspondingly. Further, the processor 13 may control the communication module 11 to transmit the sound signal to the backend monitoring device 30 through the communication satellite 20.

In an embodiment, the rescue positioning device 10 includes an input element and an output element electrically connected to the processor 13. The input element is configured to be operated by the user to record messages, and the output element is configured to show (display or playback) messages. When the communication module 11 receives messages from the backend monitoring device 30 through the communication satellite 20, the processor 13 controls the output element to show the messages. When the user operates the input element to record messages, the processor 13 controls the communication module 11 to transmit the recorded messages to the backend monitoring device 30 through the communication satellite 20. By the input and output elements, the user wearing the rescue positioning device 10 can communicate with the operators of the backend monitoring device 30, thereby allowing the user to provide specific information about the location, terrain, distress situation, and physical and mental condition and to understand the current progress of the rescue operation. The said messages may include texts, images, and/or sounds, and the implementation of the input and output elements may be adjusted according to the type of messages. For example, when the messages include sounds, the above-mentioned sound-capturing element 18 and sound-emitting element 16 can serve as the input and output elements respectively. When the messages include texts, the input and output elements may include a keyboard and a monitor, but not limited thereto. When the messages include images, the input and output elements may include a camera and a monitor, but not limited thereto.

It is noted that, in the above embodiments, the processor 13 automatically generates the distress signal when it determines the event of anomaly occurs according to the detection signal, thereby preventing the user from being unable to seek help because of losing consciousness or mobility. However, the present disclosure is not limited to this. In an embodiment, the user may actively control the processor 13 to generate the distress signal through operating the operation interface 17. Consequently, in unexpected emergency situations, even if the processor 13 does not detect the distress situation according to the detection signal and generate the distress signal, the user can actively operate the operation interface 17 to generate the distress signal for seeking help.

Figure 3:
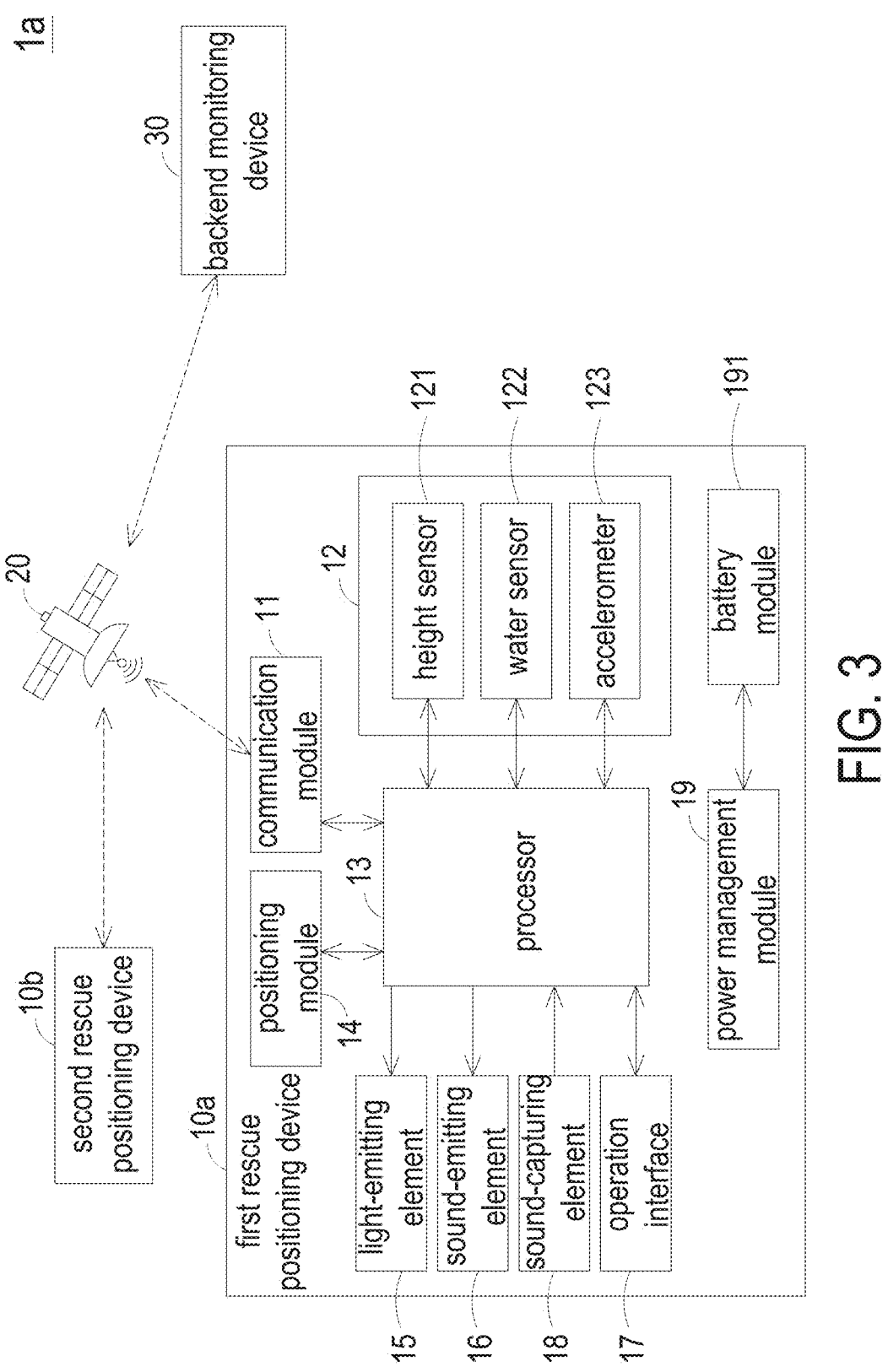
FIG. 3 is a schematic block diagram illustrating a rescue positioning system according to another embodiment of the present disclosure.

FIG. 3 is a schematic block diagram illustrating a rescue positioning system according to another embodiment of the present disclosure. The component parts and elements corresponding to those of FIG. 1 are designated by identical numeral references, and detailed descriptions thereof are omitted herein. In an embodiment, the rescue positioning system includes a plurality of rescue positioning devices. When the backend monitoring device 30 receives the distress signal and arranges for rescue operations, the rescue person can also wear the rescue positioning device, which allows the backend monitoring device 30 to support rescue operations through the communication satellites 20 and the rescue positioning device worn by the rescue person. For example, in the rescue positioning system 1a shown in FIG. 3, the first rescue positioning device 10a represents the rescue positioning device worn by the victim (i.e., the rescue positioning device which emits the distress signal), and the second rescue positioning device 10b represents the rescue positioning device worn by the rescue person. The first rescue positioning device 10a and the second rescue positioning device 10b have identical hardware architecture similar to the rescue positioning device 10 of FIG. 1 and have various possible implementations according to the foregoing embodiments, and thus detailed descriptions thereof are omitted herein. As shown in FIG. 3, the communication module 11 of the second rescue positioning device 10b may receive the location coordinate of the first rescue positioning device 10a from the backend monitoring device 30 through the communication satellite 20 such that the rescue person knows the exact location of the victim. Moreover, as the first rescue positioning device 10a continues to transmit its location coordinate to the backend monitoring device 30 through the communication satellite 20, the second rescue positioning device 10b can also continuously receive the real-time location coordinate of the first rescue positioning device 10a from the backend monitoring device 30 through the communication satellite 20.

The rescue person may operate the operation interface 17 of the second rescue positioning device 10b to let the communication module 11 of the second rescue positioning device 10b send a request signal to the backend monitoring device 30, and the backend monitoring device 30 receives the request signal through the communication satellite 20. According to the request signal, the backend monitoring device 30 transmits a control signal to the communication module 11 of the first rescue positioning device 10a through the communication satellite 20 to make the first rescue positioning device 10a operate correspondingly. In specific, under the circumstance that the first rescue positioning device 10a includes the light-emitting element 15, according to the control signal outputted by the backend monitoring device 30 in response to the request signal, the processor 13 of the first rescue positioning device 10a controls the light-emitting element 15 to emit warning lights. Similarly, under the circumstance that the first rescue positioning device 10a includes the sound-emitting element 16, according to the control signal outputted by the backend monitoring device 30 in response to the request signal, the processor 13 of the first rescue positioning device 10a controls the sound-emitting element 16 to emit warning sounds. Therefore, when the rescue person approaches the victim's location, the rescue person may operate the second rescue positioning device 10b to make the first rescue positioning device 10a emit warning lights and/or warning sounds, which facilitates searching the victim.

In addition, under the circumstance that both the first rescue positioning device 10a and the second rescue positioning device 10b include the above-mentioned input and output elements, both the rescue person and the victim not only can communicate with the operators of the backend monitoring device 30 through their respective rescue positioning devices but also can communicate with each other through the backend monitoring device 30. In specific, when the victim operates the input element of the first rescue positioning device 10a to record a message, the communication module 11 of the first rescue positioning device 10a transmits the message to the backend monitoring device 30 through the communication satellite 20. The backend monitoring device 30 then transmits the message to the communication module 11 of the second rescue positioning device 10b through the communication satellite 20, and the output element of the second rescue positioning device 10b shows the message recorded by the victim to the rescue person. Conversely, when the rescue person operates the input element of the second rescue positioning device 10b to record a message, the communication module 11 of the second rescue positioning device 10b transmits the message to the backend monitoring device 30 through the communication satellite 20. The backend monitoring device 30 then transmits the message to the communication module 11 of the first rescue positioning device 10a through the communication satellite 20, and the output element of the first rescue positioning device 10a shows the message recorded by the rescue person to the victim. Consequently, the communication between the victim and the rescue person is realized, thereby enhancing rescue efficiency.

In summary, the present disclosure provides a rescue positioning system in which the communication satellite communicates with the rescue positioning device and the backend monitoring device. The rescue positioning device may transmit signals to the backend monitoring device or receive signals from the backend monitoring device through the communication satellite, without the need of relay stations for signal transmission. Consequently, the signal transmission would not be limited by distance, climate or terrain, and simultaneously the confidentiality of the signal transmission is ensured. Additionally, the rescue positioning device obtains the location coordinate through the satellite positioning system and, in the event of anomaly, immediately transmits the distress signal and location coordinate to the backend monitoring device through the communication satellite. Accordingly, the backend monitoring device can immediately ascertain the exact location and arrange for rescue, thereby improving rescue efficiency. Moreover, under the circumstance that the rescue person also wears the rescue positioning device, the rescue person may operate its rescue positioning device to control the rescue positioning device worn by the victim to emit warning lights and/or warning sounds. Further, the rescue person and the victim may communicate with each other by texts, images and/or sounds through their rescue positioning devices, thereby improving the rescue efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rescue positioning system, comprising:

a first rescue positioning device, a communication satellite and a backend monitoring device, wherein the first rescue positioning device and the backend monitoring device respectively communicate with the communication satellite and are configured to transmit signals to each other through the communication satellite, the first rescue positioning device is configured to be worn by a user, and the first rescue positioning device comprises:

a communication module, configured to communicate with the communication satellite;

a detection module, configured to detect location and environment information of the first rescue positioning device and generate a detection signal correspondingly;

a processor, electrically connected to the communication module and the detection module, and receiving the detection signal, wherein the processor is configured to generate a distress signal when the processor determines that the location and environment information of the first rescue positioning device is abnormal according to the detection signal, and the communication module is configured to automatically transmit the distress signal to the backend monitoring device through the communication satellite as the processor generates the distress signal; and a positioning module, electrically connected to the processor, and configured to obtain a location coordinate of the first rescue positioning device through a satellite positioning system, wherein the processor is configured to control the communication module to transmit the location coordinate to the backend monitoring device through the communication satellite as the processor generates the distress signal, wherein the backend monitoring device is configured to notify a rescue person to proceed to a location of the first rescue positioning device according to the location coordinate for rescue upon receiving the distress signal.

2. The rescue positioning system according to claim 1, wherein the detection module comprises a height sensor and a water sensor, the height sensor is configured to detect an altitude of the first rescue positioning device, the water sensor is configured to detect whether the first rescue positioning device is in water, and the processor is configured to determine that the location and environment information of the first rescue positioning device is abnormal and generate the distress signal when the processor confirms that change in the altitude exceeds a preset value and the first rescue positioning device is in water according to the detection signal.

3. The rescue positioning system according to claim 1, wherein the detection module comprises a height sensor and an accelerometer, the height sensor is configured to detect an altitude of the first rescue positioning device, the accelerometer is configured to detect an acceleration of the first rescue positioning device, and the processor is configured to determine that the location and environment information of the first rescue positioning device is abnormal and generate the distress signal when the processor confirms that change in the altitude exceeds a first preset value and the acceleration is greater than a second present value according to the detection signal.

4. The rescue positioning system according to claim 1, wherein the detection module further detects physiological information of the user wearing the first rescue positioning device and generates the detection signal correspondingly, and the processor is configured to generate the distress signal when the processor determines that the physiological information of the user is abnormal according to the detection signal.

5. The rescue positioning system according to claim 1, wherein the first rescue positioning device further comprises a light-emitting element electrically connected to the processor, and the processor is configured to control the light-emitting element to emit warning lights when the processor generates the distress signal.

6. The rescue positioning system according to claim 1, wherein the first rescue positioning device further comprises a sound-emitting element electrically connected to the processor, and the processor is configured to control the sound-emitting element to emit warning sounds when the processor generates the distress signal.

7. The rescue positioning system according to claim 1, wherein the first rescue positioning device further comprises an operation interface electrically connected to the processor, and the operation interface is configured to be operated by the user to control the processor to generate the distress signal.

8. The rescue positioning system according to claim 1, wherein the first rescue positioning device further comprises a light-emitting element and an operation interface electrically connected to the processor, and the operation interface is configured to be operated by the user to make the processor control the light-emitting element to emit warning lights.

9. The rescue positioning system according to claim 1, wherein the first rescue positioning device further comprises a sound-emitting element and an operation interface electrically connected to the processor, and the operation interface is configured to be operated by the user to make the processor control the sound-emitting element to emit warning sounds.

10. The rescue positioning system according to claim 1, wherein the first rescue positioning device further comprises a sound-capturing element and an operation interface electrically connected to the processor, the operation interface is configured to be operated by the user to make the processor control the sound-capturing element to capture sounds and generate a sound signal correspondingly, and the processor is configured to control the communication module to transmit the sound signal to the backend monitoring device through the communication satellite.

11. The rescue positioning system according to claim 1, wherein the first rescue positioning device further comprises an input element and an output element electrically connected to the processor, when the communication module receives a first message from the backend monitoring device through the communication satellite, the processor controls the output element to show the first message; when the input element is operated by the user to record a second message, the processor controls the communication module to transmit the second message to the backend monitoring device through the communication satellite; and the first message and the second message comprise texts, images and/or sounds.

12. The rescue positioning system according to claim 1, further comprising a second rescue positioning device worn by the rescue person, wherein when the first rescue positioning device sends out the distress signal, the second rescue positioning device receives the location coordinate of the first rescue positioning device from the backend monitoring device through the communication satellite.

13. The rescue positioning system according to claim 12, wherein the first rescue positioning device further comprises a light-emitting element and an operation interface electrically connected to the processor, an operation interface of the second rescue positioning device is configured to be operated by the rescue person to send out a request signal, the backend monitoring device is configured to receive the request signal through the communication satellite and transmit a control signal to the communication module of the first rescue positioning device through the communication satellite, and the processor of the first rescue positioning device is configured to control the light-emitting element of the first rescue positioning device to emit warning lights according to the control signal.

14. The rescue positioning system according to claim 12, wherein the first rescue positioning device further comprises a sound-emitting element and an operation interface electrically connected to the processor, an operation interface of the second rescue positioning device is configured to be operated by the rescue person to send out a request signal, the backend monitoring device is configured to receive the request signal through the communication satellite and transmit a control signal to the communication module of the first rescue positioning device through the communication satellite, and the processor of the first rescue positioning device is configured to control the sound-emitting element of the first rescue positioning device to emit warning sounds according to the control signal.

15. The rescue positioning system according to claim 12, wherein the first rescue positioning device further comprises an input element and an output element electrically connected to the processor, when the communication module receives a first message from the backend monitoring device through the communication satellite, the processor controls the output element to show the first message; and when the input element is operated by the user to record a second message, the processor controls the communication module to transmit the second message to the backend monitoring device through the communication satellite.

16. The rescue positioning system according to claim 15, wherein through the communication satellite, the backend monitoring device transmits the second message recorded by the input element of the first rescue positioning device to the second rescue positioning device.

17. The rescue positioning system according to claim 15, wherein the first message and the second message comprise texts, images and/or sounds.

18. The rescue positioning system according to claim 12, wherein the first rescue positioning device and the second rescue positioning device have the same hardware architecture.

19. The rescue positioning system according to claim 1, wherein the processor is configured to control the communication module to transmit the location coordinate to the backend monitoring device through the communication satellite with a preset frequency.

20. The rescue positioning system according to claim 1, wherein the first rescue positioning device further comprises a power management module and a battery module, the power management module is electrically connected between the battery module and the processor, the battery module is configured to supply power to the first rescue positioning device, and the power management module is configured to control charging and discharging of the battery module.

21. The rescue positioning system according to claim 1, wherein the communicate satellite comprises a low Earth orbit satellite.

* * * * *